United States Patent
Nishizawa et al.

(10) Patent No.: US 12,152,519 B2
(45) Date of Patent: Nov. 26, 2024

(54) REGENERATION CONTROL APPARATUS

(71) Applicant: MITSUBISHI HEAVY INDUSTRIES ENGINE & TURBOCHARGER, LTD., Sagamihara (JP)

(72) Inventors: Kazuki Nishizawa, Tokyo (JP); Kazutoshi Nomura, Tokyo (JP); Tomohide Yamada, Sagamihara (JP); Ryuji Kita, Sagamihara (JP); Mizuki Kanai, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/015,904

(22) PCT Filed: Jul. 20, 2021

(86) PCT No.: PCT/JP2021/027152
§ 371 (c)(1),
(2) Date: Jan. 12, 2023

(87) PCT Pub. No.: WO2022/049914
PCT Pub. Date: Mar. 10, 2022

(65) Prior Publication Data
US 2023/0279798 A1    Sep. 7, 2023

(30) Foreign Application Priority Data

Sep. 7, 2020 (JP) .................................. 2020-149765

(51) Int. Cl.
*F01N 3/035* (2006.01)
*F01N 3/023* (2006.01)
(Continued)

(52) U.S. Cl.
CPC ............. *F01N 3/035* (2013.01); *F01N 3/023* (2013.01); *F01N 3/0253* (2013.01); *F01N 11/002* (2013.01); F01N 2900/0408 (2013.01)

(58) Field of Classification Search
CPC .............. F01N 11/002; F01N 2430/08; F01N 2900/0408; F01N 2900/1602; F01N 3/021;
(Continued)

(56) References Cited

U.S. PATENT DOCUMENTS

2004/0133335 A1   7/2004  Nakano et al.
2009/0165445 A1   7/2009  Haseyama et al.
(Continued)

FOREIGN PATENT DOCUMENTS

DE     102014016700    *  5/2016
EP     3 276 136 A1       1/2018
(Continued)

OTHER PUBLICATIONS

International Preliminary Report on Patentability and Written Opinion of the International Searching Authority for International Application No. PCT/JP2021/027152, dated Mar. 16, 2023, with an English translation.

(Continued)

*Primary Examiner* — Phutthiwat Wongwian
*Assistant Examiner* — Diem T Tran
(74) *Attorney, Agent, or Firm* — Birch, Stewart, Kolasch & Birch, LLP (57) ABSTRACT

A regeneration control apparatus for controlling, in an exhaust gas treatment apparatus of a diesel engine including a diesel oxidation catalyst (DOC) disposed in an exhaust passage of an internal combustion engine and a diesel particulate filter (DPF) disposed downstream of the DOC, execution of forced regeneration to remove an exhaust (Continued)

particulate matter (PM) which accumulates on the DPF through a temperature increase of the DPF, includes: a late-post injection amount determination part which determines a late-post injection amount. The late-post injection amount determination part is configured to determine an upper limit value of the late-post injection amount on the basis of an air excess ratio of exhaust gas flowing into the DOC obtained on the basis of a temperature index of the DOC.

2 Claims, 8 Drawing Sheets (51) Int. Cl.
    *F01N 3/025*     (2006.01)
    *F01N 11/00*     (2006.01)

(58) Field of Classification Search
    CPC ........ F01N 3/023; F01N 3/0253; F01N 3/035; F01N 3/103; F01N 9/002; Y02T 10/40
    See application file for complete search history.

(56) References Cited

U.S. PATENT DOCUMENTS

2009/0293453 A1* 12/2009 Sujan ...................... F01N 3/035
    60/285
2011/0173952 A1* 7/2011 Cassani ................. F02D 41/029
    60/274
2013/0104529 A1 5/2013 Takayanagi et al.
2013/0108511 A1 5/2013 Ide et al.

FOREIGN PATENT DOCUMENTS

| JP | 2004-197697 A | | 7/2004 |
|---|---|---|---|
| JP | 2004308509 | * | 11/2004 |
| JP | 2007-198283 A | | 8/2007 |
| JP | 2010-31833 A | | 2/2010 |
| JP | 2011-231645 A | | 11/2011 |
| JP | 2011231645 | * | 11/2011 |
| JP | 2012-72666 A | | 4/2012 |
| JP | 2012-92759 A | | 5/2012 |
| JP | 2017-31843 A | | 2/2017 |
| WO | WO-2007138454 | * | 12/2007 |
| WO | WO 2012/030280 A1 | | 3/2012 |

OTHER PUBLICATIONS

International Search Report and Written Opinion of the International Searching Authority for International Application No. PCT/JP2021/027152, dated Oct. 12, 2021.

Extended European Search Report for European Application No. 21863972.2, dated Oct. 18, 2023.

* cited by examiner

| DOC INLET TEMPERATURE [°C] | 200 | 220 | 240 | 250 | 270 | 280 | 300 | 330 |
|---|---|---|---|---|---|---|---|---|
| EXHAUST AIR EXCESS RATIO LOWER LIMIT VALUE [-] | A1 | A1 | A2 | A2 | A3 | A4 | A5 | A6 |

| OPERATION PATTERN | DOC INLET TEMPERATURE (WHEN HC SLIP IS MAX.) [°C] | HC SLIP MAX. CONCENTRATION [ppm] | | FORCED REGENERATION TIME [sec] | |
|---|---|---|---|---|---|
| | | COMPARATIVE EXAMPLE | WORKING EXAMPLE | COMPARATIVE EXAMPLE | WORKING EXAMPLE |
| OPERATION PATTERN 1 | 285 | 5211 | 130 | 1593 | 1522 |
| OPERATION PATTERN 2 | 285 | 6800 | 600 | 1223 | 1151 |
| OPERATION PATTERN 3 | 250 | 4050 | 89 | – | – |
| OPERATION PATTERN 4 | 240 | 11000 | 130 | – | – |

REGENERATION CONTROL APPARATUS

TECHNICAL FIELD

The present disclosure relates to a regeneration control apparatus for regenerating an exhaust gas treatment apparatus including a DOC and a DPF, disposed in an exhaust passage of a diesel engine.

The present application claims priority based on Japanese Patent Application No. 2020-149765 filed on Sep. 7, 2020, with the Japanese Patent Office, the contents of which are incorporated herein by reference.

BACKGROUND ART

A diesel engine is equipped with an exhaust gas treatment apparatus including a diesel oxidation catalyst (DOC) disposed in an exhaust passage and a diesel particulate filter (DPF) disposed at the downstream side of the DOC. The DPF is a device for collecting particulate matters (PM) contained in the exhaust gas discharged from the diesel engine.

The DPF is normally formed of ceramic or the like into a honeycomb-shaped monolith with adjacent vents closed alternately on the inlet side and the outlet side so that exhaust gas passes through filtering walls which remove PM. The DPF may support a catalyst. The DOC is normally formed of ceramic or the like into a honeycomb-shaped monolith, similarly to the DPF, and supports an oxidization catalyst on the inner surface thereof.

Accumulation of PM in the DPF eventually brings about clogging, which leads to not only deterioration of the PM-collecting performance of the DPF but also to an increase in an exhaust pressure and thus has a negative effect on the fuel efficiency. In view of this, it is necessary to perform forced regeneration to remove the PM accumulated in the DPF when the accumulation amount of PM reaches a predetermined amount or an engine operation time reaches a predetermined time. The forced regeneration of the DPF is performed by increasing the exhaust gas temperature and increasing the temperature of the DPF in a forced manner. For instance, the temperature increase is carried out by delaying the fuel injection timing, post injection, suction of air or narrowing exhaust gas.

In forced regeneration of the DPF, if the injection amount of non-combusted fuel (post injection amount) is greater than the amount that can be oxidized by the DOC, the non-combusted fuel is discharged without being oxidized, which may lead to generation of white smoke. Techniques to suppress such generation of while smoke have been proposed. For instance, Patent Document 1 discloses a control to set the minimum value of the injection amount obtained from each of the air-fuel ratio, the atmospheric pressure, and the catalyst reaction from the DOC temperature and the rotation speed, as the upper limit value of the injection amount.

CITATION LIST

Patent Literature

Patent Document 1: JP2007-198283A

SUMMARY

Problems to be Solved

However, in fact, white smoke is generated upon load change only if the air-fuel ratio is low. Thus, when the control method disclosed in Patent Document 1 is used, the upper limit value of the injection amount is after all determined only by the air-fuel ratio, regardless of the DOC temperature. With such a method, the injection amount needs to be limited to prevent generation of white smoke at any DOC temperature. Thus, it is necessary to set a smaller injection amount to prevent white smoke at any temperature, and a control is executed to suppress the injection amount to an unnecessary extent, which may lead to an increase in the DPF regeneration time.

In view of the above, an object of the present disclosure is to realize an adapted control so as not to excessively suppress the late post injection amount of injection at a timing that does not contribute to in-cylinder combustion, and reduce generation of white smoke without increasing the DPF regeneration time.

Solution to the Problems

A regeneration control apparatus according to the present disclosure is a regeneration control apparatus for controlling, in an exhaust gas treatment apparatus of a diesel engine including a diesel oxidation catalyst (DOC) disposed in an exhaust passage of an internal combustion engine and a diesel particulate filter (DPF) disposed downstream of the DOC, execution of forced regeneration to remove an exhaust particulate matter (PM) which accumulates on the DPF through a temperature increase of the DPF, and the regeneration control apparatus includes: a late-post injection amount determination part which determines a late-post injection amount, and the late-post injection amount determination part is configured to determine an upper limit value of the late-post injection amount on the basis of an air excess ratio of exhaust gas flowing into the DOC obtained on the basis of a temperature index of the DOC.

Advantageous Effects

According to the present disclosure, it is possible to realize an adapted control so as not to excessively suppress the late post injection amount, and reduce generation of white smoke without increasing the DPF regeneration time.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Entire Configuration of Diesel Engine)

Figure 1:
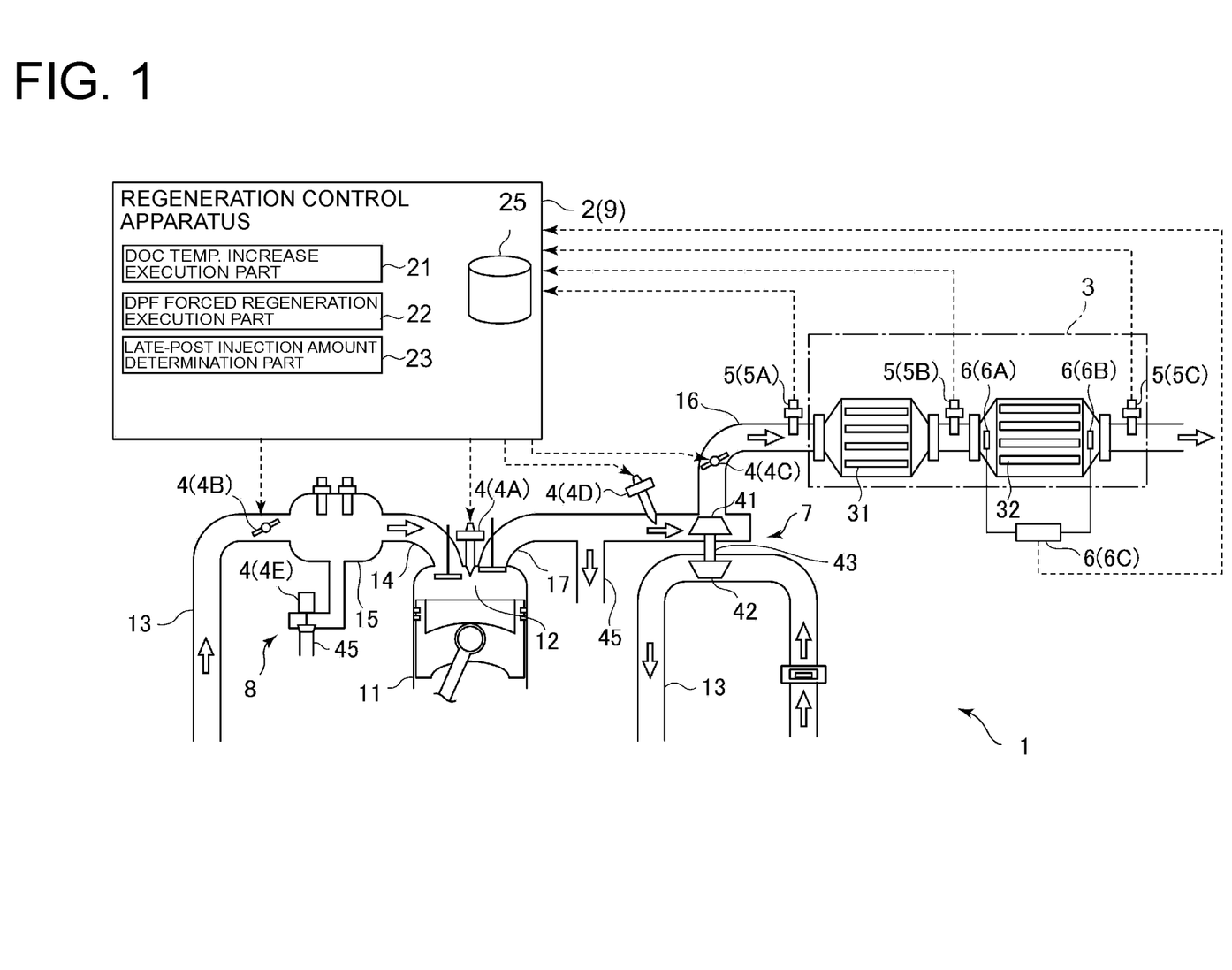
FIG. 1 is a schematic diagram illustrating an overall configuration of a diesel engine including a regeneration control device according to an embodiment.

FIG. 1 is a schematic diagram illustrating an overall configuration of a diesel engine 1 including a regeneration control apparatus 2, according to an embodiment of the present invention. The regeneration control apparatus 2 performs regeneration (i.e., the recovery process for the DOC 31 and the forced regeneration process for the DPF 32) of an exhaust gas treatment apparatus 3 disposed in an exhaust passage 16 of the diesel engine 1, by controlling a temperature increase unit 4 (4A, 4B, 4C, 4D, 4E) of the exhaust gas treatment apparatus 3.

As depicted in FIG. 1, the diesel engine 1 includes an engine body 11, an intake passage 13, an exhaust passage 16, an exhaust turbocharger 7, and an EGR device 8, in addition to the regeneration control apparatus 2 (ECU 9) and the exhaust gas treatment apparatus 3. In an embodiment depicted in FIG. 1, the regeneration control apparatus 2 is an engine control unit (ECU) 9, and is implemented as one of the functions (program or circuit) of the ECU 9. Nevertheless, in some embodiments, the regeneration control apparatus 2 may be configured as another electronic control unit including a processor, separate from the ECU 9 for controlling the diesel engine 1.

The ECU 9 is an electronic control unit for controlling the diesel engine 1. For instance, the ECU 9 may be configured as a microcomputer including a central processing unit (CPU) that includes a processor, a random access memory (RAM), a read only memory (ROM), and an I/O interface.

To the engine body 11, the intake passage 13 and the exhaust passage 16 are connected. The intake passage 13 is a passage for supplying air (intake air) outside the diesel engine 1 to a combustion chamber 12 formed in the engine body 11. The exhaust passage 16 is a passage for discharging combustion gas (exhaust gas) from the combustion chamber 12 to the outside of the diesel engine 1.

The exhaust passage 16 includes an exhaust throttle valve 4 (4C) at a position immediately upstream the DOC 31. The opening degree of the exhaust throttle valve 4 (4C) is controlled by the regeneration control apparatus 2 (ECU 9).

The diesel engine 1 includes a fuel injection device 4 (4A) for injecting a high-pressure fuel to the combustion chamber 12. The fuel injection device 4A is connected to a common rail (not depicted) accumulating a high-pressure fuel, and the ECU 9 controls the injection timing and the fuel injection amount of the fuel injection device 4 (4A). The high-pressure fuel injected into the combustion chamber 12 is mixed with intake air that is supplied through the intake passage 13, combusted in the combustion chamber 12, and is discharged to the outside of the diesel engine 1 through the exhaust passage 16.

The exhaust turbocharger 7 is disposed in the intake passage 13 and the exhaust passage 16. The exhaust turbocharger 7 includes an exhaust turbine 41 disposed in the exhaust passage 16 and a compressor 42 disposed in the intake passage 13, and the exhaust turbine 41 and the compressor 42 are coupled via a shaft 43. Further, as exhaust gas passing through the exhaust passage 16 rotary drives the exhaust turbine 41, the compressor 42 coaxially coupled to the exhaust turbine 41 via the shaft 43 is also rotary driven.

An inter cooler (not depicted) and an intake throttle valve 4 (4B) are disposed in the intake passage 13. The inter cooler (not depicted) cools the compressed intake air discharged from the compressor 42, then the intake throttle valve 4 (4B) controls the intake flow rate, and then the compressed intake air flows into the combustion chamber 12 inside each cylinder of the diesel engine 1 via the intake port 14 disposed on the body (cylinder head, not depicted) of the diesel engine 1. The opening degree of the intake throttle valve 4 (4B) is controlled by the regeneration control apparatus 2 (ECU 9).

The diesel engine 1 is provided with an EGR device 8. That is, the intake passage 13 and the exhaust passage 16 are coupled via the EGR pipe 45, such that a part of exhaust gas that flows through the exhaust passage 16 can be recirculated to the intake passage 13.

An end of the EGR pipe 45 is connected to an immediately downstream position of the exhaust port 17, and the EGR pipe 45 branches from the exhaust passage 16. Further, the other end of the EGR pipe 45 is connected to an intake manifold 15 (intake passage 13) which is disposed at the downstream side of the intake throttle valve 4 (4B). Further, an EGR valve 4 (4E) is disposed in the EGR pipe 45. By controlling the EGR valve 4 (4E), at least a part of exhaust gas discharged from the diesel engine 1 flows through the EGR pipe 45 and recirculates through the diesel engine 1. The opening degree of the EGR valve 4 (4E) is also controlled by the regeneration control apparatus 2 (ECU 9).

As described above, in the diesel engine 1, the exhaust gas discharged from the engine body 11 (combustion chamber 12) drives the exhaust turbine 41 described above, and flows into the exhaust gas treatment apparatus 3 disposed in the exhaust passage 16.

The exhaust gas treatment apparatus 3 includes a diesel oxidation catalyst (DOC) 31 disposed in the exhaust passage 16 of the diesel engine 1, and a diesel particulate filter (DPF) 32 disposed in the exhaust passage 16 downstream of the DOC 31. The DOC 31 has a function to oxidize and remove non-combusted fuel (HC) and carbon monoxide (CO) from exhaust gas and to oxidize nitrogen monoxide (NO) in the exhaust gas to produce nitrogen dioxide ($NO_2$). Further, the DOC 31 increases the temperature of passing exhaust gas with oxidation heat of fuel injected into the DOC 31, thereby increasing the inlet temperature of the DPF 32.

The DPF 32 is a device which collects particulate matters (PM), such as soot, contained in exhaust gas with a filter to remove the particulate matters from exhaust gas. That is, exhaust gas after flowing into the exhaust gas treatment apparatus 3 passes through the DOC 31, and then passes through the DPF 32 inside the exhaust gas treatment apparatus 3. Upon passage, the DOC 31 oxidizes and removes the non-combusted fuel (HC) and carbon monoxide (CO) from exhaust gas. Further, the DPF 32 collects particulate matters (PM) contained in the exhaust gas, thereby removing PM from the exhaust gas. Then, the exhaust gas is discharged outside the diesel engine 1.

As the exhaust gas passes through the exhaust gas treatment apparatus 3 as described above, if the operation load of the diesel engine 1 and the exhaust gas temperature remain at a low level continuously, the SOF component or soot of non-combusted fuel or the like adheres to an upstream end surface of the DOC 31, and clogging of the DOC 31 gradually progresses. The adhering substances that bring about clogging of the DOC 31 are removable by increasing the temperature of the DOC 31. Therefore, the regeneration control apparatus 2 controls a temperature increase unit 4 (described below) to increase the temperature of the DOC 31 that is in a temperature-increase necessary state.

The regeneration control apparatus 2 monitors the state of the exhaust gas and the exhaust gas treatment apparatus 3 on the basis of detection values from various sensors disposed in the exhaust passage 16. For example, as depicted in FIG. 1, a DOC inlet temperature sensor 5 (5A) is disposed at the inlet of the DOC 31, to detect the temperature of exhaust gas flowing into the DOC 31. A DPF inlet temperature sensor 5 (5B) is disposed at the inlet of the DPF 32 (between the DOC 31 and the DPF 32), and a DPF outlet temperature sensor 5 (5C) is disposed at the outlet of the DPF 32. Furthermore, a DPF inlet pressure sensor 6 (6A) is disposed at the inlet of the DPF 32, and a DPF outlet pressure sensor 6 (6B) is disposed at the outlet of the DPF 32. Furthermore, a DPF differential-pressure sensor 6 (6C) for detecting the differential pressure between the inlet and the outlet of the DPF 32 is disposed on the DPF 32. The detection values of the temperature sensors 5 and the pressure sensors 6 are inputted into the regeneration control apparatus 2, and used in execution of the DOC temperature increase control and the DPF forced regeneration process described below.

(DOC Temperature Increase Control)

A DOC temperature increase execution part 21 carries out a temperature increase for recovering the DOC 31 by controlling the temperature increase unit 4, if the temperature increase necessary state of the DOC 31 is detected. The process controls the temperature increase unit 4 (described below) to increase the temperature of the DOC 31 to the temperature T1 (see FIG. 3). The temperature T1 is a temperature at which the DOC 31 activates, and is set to 250 C°, for instance. The temperature increase process may be a process of carrying out temperature increase in two steps. In the two-step temperature increase, for instance, after maintaining the temperature T1 for a predetermined time, the DOC 31 is heated to a temperature higher than the temperature T1 (e.g., a temperature for combusting adhering substances on the upstream end surface of the DOC 31, such as 400° C. and maintain the temperature.

Figure 2:
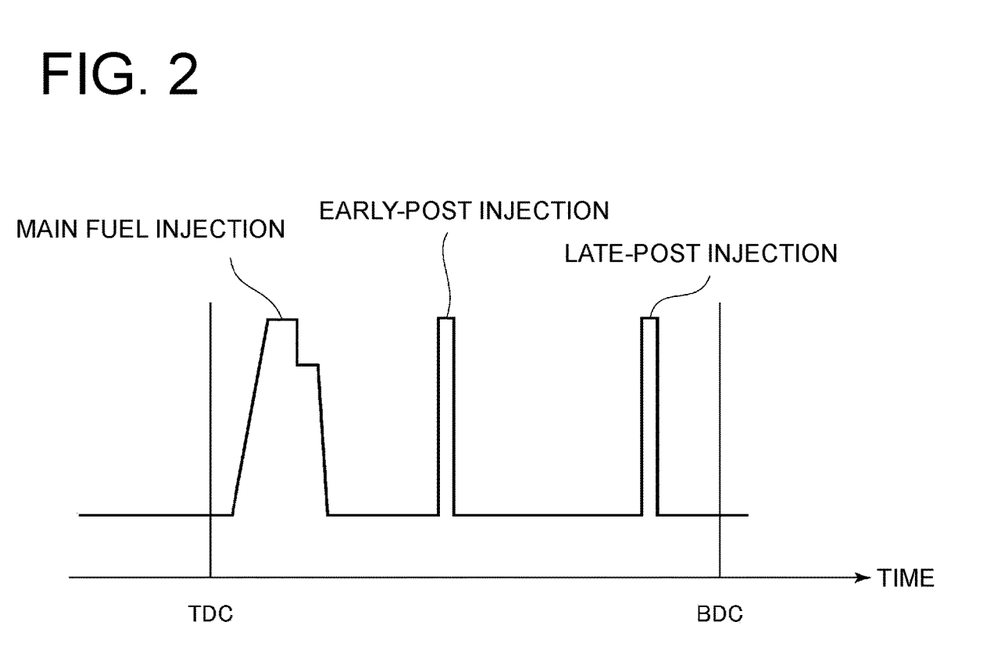
FIG. 2 is a diagram for describing a forced regeneration process of a DPF which is carried out through early-post injection and late-post injection according to an embodiment.

Furthermore, the temperature increase unit 4 controlled in the DOC temperature increase control is, for instance, a fuel injection device 4A (see FIG. 1) for injecting a fuel into the combustion chamber 12 of the diesel engine 1. Then, the DOC temperature increase process is carried out by changing the timing and the injection amount of early-post injection by the fuel injection device 4 (4A). FIG. 2 is a diagram for describing a forced regeneration process of a DPF which is carried through early-post injection and late-post injection according to an embodiment. As depicted in FIG. 2, the early-post injection is the first post injection where a smaller amount of fuel than the main injection is injected while the pressure in the combustion chamber 12 is still high immediately after injection of the main fuel, in the step of injecting fuel in the diesel engine 1. By changing the conditions of the early-post injection appropriately, it is possible to increase the exhaust gas temperature.

In some other embodiments, the temperature increase unit 4 controlled in the DOC temperature increase control may be an intake throttle valve 4 (4B), or a common-rail pressure control unit (not depicted) which controls the common rail pressure of injection of the fuel. In some yet other embodiments, the temperature increase unit 4 may be at least one of the fuel injection device 4A, the intake throttle valve 4B, the common rail pressure control unit (not depicted), the exhaust pipe injection device 4D, the exhaust throttle valve 4C, or the EGR valve 4E.

(DPF Forced Regeneration Process)

As depicted in FIG. 1, the regeneration control apparatus 2 further includes a DPF forced regeneration execution part 22. The DPF forced regeneration execution part 22 is configured to execute forced regeneration to control the temperature increase unit 4 so as to increase the temperature of the DPF 32 to the temperature T2. The temperature T2 is a temperature higher than the temperature T1, and is set to a temperature not lower than 600° C., for instance.

Figure 3:
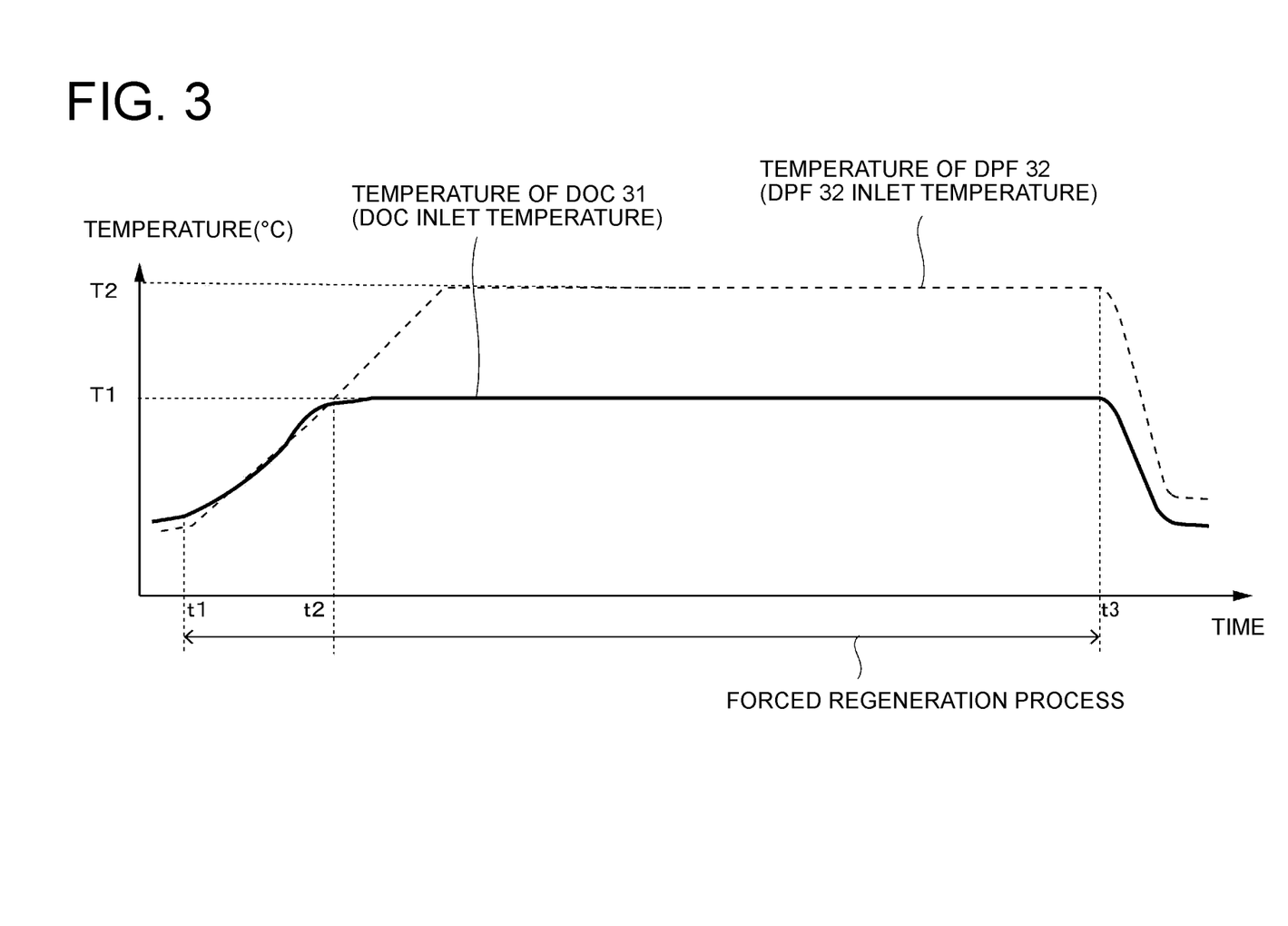
FIG. 3 is a time chart showing an example of temperature transition in a case where the regeneration control apparatus according to an embodiment carries out the forced regeneration process.

FIG. 3 is a time chart showing an example of temperature transition in a case where the regeneration control apparatus 2 according to an embodiment carries out the forced regeneration process. In the present example, the forced regeneration process starts at time t1, and continues until time t3. The late-post injection is carried out from time t2, when the DOC inlet temperature reaches the temperature T1, through to time t3. The temperature of the DOC 31 is obtained on the basis of the detection value of the DOC inlet temperature sensor 5 (5A), and the temperature of the DPF 32 is obtained on the basis of the detection value of the DPF inlet temperature sensor 5 (5B).

Now, the forced regeneration of the DPF 32 will be described. As described above, when exhaust gas passes through the exhaust gas treatment apparatus 3, PM (particulate matter) in exhaust gas is collected by the DPF 32. If exhaust gas discharged from the engine body 11 (combustion chamber 12) in operation has a high temperature, PM collected by the DPF 32 is combusted by the high-temperature exhaust gas, and is removed naturally (natural regeneration). However, PM that has not been removed by natural regeneration accumulates on the filter of the DPF 32. Then, excessive accumulation of PM may bring about deterioration in the PM collecting performance and a decrease in the engine output, for instance.

Thus, in the exhaust gas treatment apparatus 3 including the DPF 32, by performing the forced regeneration process at an appropriate timing, PM that accumulates on the filter of the DPF 32 is forcedly combusted and removed. Further, the forced regeneration process can be classified into at least two types in terms of the starting trigger. That is, there are at least two types of forced regeneration: automatic regeneration that is executed automatically; and manual regeneration that is executed through manual operation of an operator.

The automatic regeneration of the DPF 32 is automatically executed if a predetermined forced-regeneration execution condition related to automatic regeneration (automatic regeneration execution condition) is satisfied, regardless of whether the vehicle is moving or standing. The forced regeneration execution condition may include, for instance: the estimate value of the PM accumulation amount in the DPF 32 exceeding a predetermined value (threshold); the operation time of the diesel engine 1 exceeding a predetermined period of time (threshold); and the cumulative of the fuel injection amount of the diesel engine 1 exceeding a predetermined amount (threshold).

The PM accumulation amount of the DPF 32 is estimated by detecting a differential pressure between the upstream and downstream sides of the DPF 32 with the DPF differential-pressure sensor 6 (6C), for instance. Furthermore, the PM accumulation amount can be also estimated by detecting the engine rotation speed, the fuel injection amount, the air flow rate, and the DPF temperature (e.g., the detection value of the DPF outlet temperature sensor 5 (5C)), estimating the PM regeneration amount inside the DPF 32 by natural regeneration and the PM discharge amount from the diesel engine 1 on the basis of the map stored in advance in the regeneration control apparatus 2, and subtracting the PM regeneration amount from the PM discharge amount.

Meanwhile, the manual regeneration of the DPF 32 is executed, for instance, under a forced regeneration execution condition (manual regeneration execution condition) that is button operation or the like by an operator or the like, basically while the vehicle is standing. The manual regeneration of the DPF 32 is carried out if more PM is accumulating than the automatic regeneration condition. For instance, the manual regeneration execution condition is that the estimation value of the PM accumulation amount exceeds a predetermined value greater than that for automatic regeneration.

Further, the manual regeneration of the DPF 32 may include combustion removal which is carried out by a maintenance personnel when PM is accumulated on the DPF 32 excessively. In this case, forced regeneration is performed taking longer time than normal manual regeneration, in order to avoid an excessive temperature increase of the DPF 32. Further, the two types of regeneration also differ in terms of the temperature at which forced regeneration is executed; the regeneration temperature is higher in the manual regeneration than in the automatic regeneration. For example, the inlet temperature of the DPF 32 is controlled to be 600 to 610° C. in the automatic regeneration, and the inlet temperature of the DPF 32 is controlled to be 620 to 630° C. in the manual regeneration.

The forced regeneration process by the above DPF forced regeneration execution part 22 will now be described in detail. In some embodiments, the temperature increase unit 4 used in the forced regeneration process is a fuel injection device 4A which injects a fuel into the combustion chamber 12 of the diesel engine 1, and an exhaust pipe injection device 4D. In this case, the forced regeneration process is executed through the early-post injection by the fuel injection device 4A, and the late-post injection by the fuel injection device 4A or exhaust pipe injection by the exhaust pipe injection device 4D disposed in the exhaust passage 16 upstream of the DOC 31.

The late-post injection is the second post injection in which the fuel is injected at a timing that does not contribute to combustion inside the combustion chamber 12 after the above described early-post injection (in the vicinity of the bottom dead center). In the example depicted in FIG. 2, while the piston disposed in the engine body 11 moves from the top dead center (TDC) to the bottom dead center (BDC), the main fuel injection is performed when the piston passes the top dead center, and then the early post injection is performed. Then, after early post injection and before the piston reaches the bottom dead center (BDC) from the top dead center (TDC), the late post injection is performed. The late-post injection causes the non-combusted fuel to flow out from the combustion chamber 12 to the exhaust passage 16, and the discharged non-combusted fuel is oxidized by the DOC 31, thereby increasing the temperature of the DPF 32 to the second temperature T2. Further, by increasing the temperature of the DPF 32 to the temperature T2, it is possible to combust the PM accumulated on the DPF 32.

In FIG. 1, the exhaust pipe injection device 4D is disposed between a downstream position of the branch position of the EGR pipe 45 and the exhaust turbine 41 of the exhaust turbocharger 7. In some embodiments, the exhaust pipe injection device 4D may be disposed between the exhaust turbine 41 and the DOC 31. Further, the fuel injection amount to be injected by the exhaust pipe injection device 4D to the exhaust passage 16 is controlled by the regeneration control apparatus 2.

In some embodiments, the forced regeneration process of the DPF 32 may be carried out after completion of the temperature increase control of the DOC 31. Further, in some embodiments, as depicted in FIG. 3, the forced regeneration process of the DPF 32 may be executed at a timing independent from the temperature increase control of the DOC 31.

In this case, in the forced regeneration process of the DPF 32, the temperature of the DPF 32 is increased to be the temperature T1 or higher, and then the DPF 32 is activated. The temperature increase may be carried out through early-post injection under a predetermined injection condition, using the fuel injection device 4A as the temperature increase unit 4. Alternatively, the temperature increase may be carried out by controlling the opening degree of the intake throttle valve 4B, using the intake throttle valve 4B as the temperature increase unit 4. Alternatively, the temperature increase may be carried out by controlling a common rail pressure of a common rail pressure control unit (not shown) for controlling the common rail pressure at which the fuel is injected, using the common rail pressure control unit as the temperature increase unit 4. Furthermore, two or more of the fuel injection device 4A, the intake throttle valve 4B, or the common rail pressure control unit (not depicted) may be used as the temperature increase unit 4 to carry out the temperature increase. Then, the forced regeneration process of the DPF 32 is carried out using the late-post injection or the exhaust pipe injection, and thereby the temperature of the DPF 32 is increased to the temperature T2.

With the above configuration, it is possible to carry out the forced regeneration process of the DPF 32 with the fuel injection device 4A and the exhaust pipe injection device 4D. Furthermore, in a case where the temperature increase unit 4 in the temperature increase control of the DOC 31 is the fuel injection device 4A, it is possible to easily carry out the temperature increase control and the forced regeneration process with the fuel injection device 4A. Furthermore, the fuel injection device 4A is normally provided for the diesel engine 1 and thus there is no need to add another temperature increase unit 4, which makes it is possible to reduce the costs.

The DPF forced regeneration execution part 22 executes the forced regeneration process (automatic regeneration), issues an alert to urge execution of the forced regeneration process, or executes the forced regeneration process (manual regeneration) according to commands by an operator, if it is determined that the forced regeneration execution condition is satisfied.

Furthermore, in some embodiments, as depicted in FIG. 1, the regeneration control apparatus 2 further includes a storage part 25. The storage part 25 may be a ROM of the regeneration control apparatus 2, a non-volatile memory such as a flash memory, a volatile memory such as a RAM, or an exterior storage device connected to the regeneration control apparatus 2. The storage part 25 may store, for instance, information and various maps indicating the corresponding relationship between the temperature index and the air excess ratio of the DOC 31, as described below.

(Configuration of the Late-Post Injection Amount Determination Part)

Figure 4:
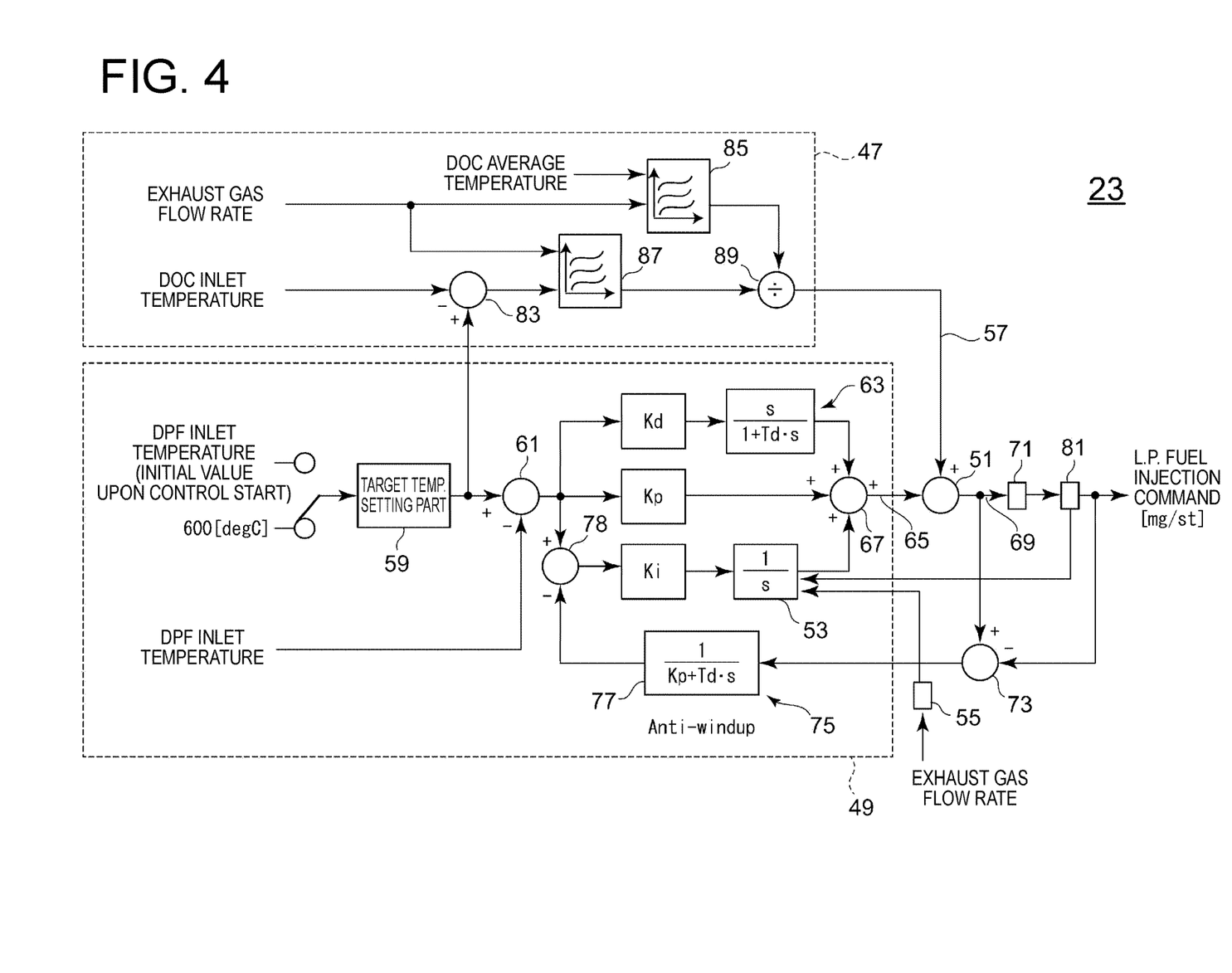
FIG. 4 is a block diagram schematically showing the configuration of a late-post injection amount determination part according to an embodiment.

As depicted in FIG. 1, the regeneration control apparatus 2 further includes a late-post injection amount determination part 23 which determines the late-post injection amount. FIG. 4 is a block diagram schematically showing the configuration of the late-post injection amount determination part 23 according to an embodiment. The configuration of the late-post injection amount determination part 23 will now be described.

The late-post injection amount determination part 23 determines the late-post injection amount (operation amount) such that the inlet temperature of the DPF 32 reaches the target temperature of approximately 600° C. in the forced regeneration process. As depicted in FIG. 4, the late-post injection amount determination part 23 includes a feedforward control part 47 configured to output a feedforward control command value 57, a feedback control part 49 configured to output a feedback control command value 65, and an adder 51 configured to add the base injection amount (feedforward control command value 57) and a correction injection amount (feedback control command value 65). Furthermore, the late-post injection amount determination part 23 includes a reset part 55 which resets the integral value of an integrator 53 which constitutes the feedback control part 49.

The feedforward control part 47 is configured to determine the base injection amount (base operation amount) of the late-post injection amount on the basis of the operation condition of the internal combustion engine, and output the base injection amount as the feedforward control command value 57. The operation condition of the internal combustion engine is, for instance, as depicted in FIG. 4, the temperature difference between the target inlet temperature of the DPF 32 and the inlet temperature of the DOC 31, and the exhaust gas flow rate.

The feedforward control part 47 includes a purification rate acquisition part 85 configured to acquire an HC purification rate on the basis of the DOC average temperature and the exhaust gas flow rate, and a light oil amount acquisition part 87 configured to acquire a necessary light oil amount on the basis of the temperature difference between the target inlet temperature of the DPF 32 and the inlet temperature of the DOC 31, and the exhaust gas flow rate. The purification rate acquisition part 85 acquires, for instance, an HC purification rate using the HC purification rate map stored in the storage part 25. The light oil amount acquisition part 87 acquires, for instance, a necessary light oil amount using the light oil amount map stored in the storage part 25.

Furthermore, the feedforward control part 47 includes a divider 89 into which the HC purification rate acquired by the purification rate acquisition part 85 and the necessary light oil amount acquired by the light oil amount acquisition part 87 are inputted. The feedforward control part 47 outputs a necessary light oil amount taking into account the HC purification rate via the divider 89 (i.e., feedforward control command value 57).

The feedback control part 49 is configured to determine the late-post correction injection amount (correction operation amount) in response to the target temperature of the DPF 32, and outputs the late-post correction injection amount as the feedback control command value 65. The feedback control part 49 includes a target temperature setting part 59 which sets an initial target temperature at the time of the start of control of the target inlet temperature of the DPF 32 and subsequent target temperatures.

In the feedback control part 49, the target inlet temperature of the DPF 32 and the actually measured inlet temperature of the DPF 32 are inputted into an adder-subtracter 61, and the difference between the target inlet temperature and the actually-measured inlet temperature is obtained as an output signal of the adder-subtracter 61. The output signal is calculated for feedback by the PID calculation part 63, and a correction injection amount being a feedback control command value 65 is calculated. As described above, the feedback control part 49 determines the correction injection amount of the late-post injection amount on the basis of the difference between the inlet temperature and the target temperature of the DPF 32.

The PID calculation part 63 calculates the proportional element (P) using the proportional gain Kp, the derivative component (D) using the derivative gain Kd, and the integral component (I) using the integral gain Ki. The respective calculation results are inputted into the adder 67 and the feedback control command value 65 is calculated.

Then, the feedforward control command value 57 and the feedback control command value 65 are inputted into the adder 51, and the addition command value 69 is outputted. The signal of the addition command value 69 is inputted into a command saturation part 71, and limitation is imposed on the output signal to protect the DPF 32. The signal having passed through the command saturation part 71 is outputted as a late-post fuel injection command signal via the limitation part 81.

The limitation part 81 of the late-post injection amount determination part 23 outputs the late-post fuel injection command signal which limits the late-post injection amount to be not greater than the upper limit value of the late-post injection amount. For instance, the late-post injection amount determination part 23 determines a sum of the base injection amount and the correction injection amount as the late-post injection amount if the sum of the base injection amount and the correction injection amount is not greater than the upper limit value of the late-post injection amount, and limit the late-post injection amount to the upper limit value of the late-post injection amount if the sum of the base injection amount and the correction injection amount is greater than the upper limit value of the late-post injection amount.

The limitation part 81 is configured to calculate the upper limit value of the late-post injection amount. For instance, the upper limit value of the late-post injection amount is calculated by the following expression: the upper limit value of the late-post injection amount[mg/INJ]=(intake air amount[kg/S]+EGR gas flow rate (intake oxygen concentration conversion value)[kg/S])/(the lower limit value of the exhaust air excess ratio[–]×theoretical air-fuel ratio[–])/engine rotation speed[rpm]×60×2×10$^6$/number of cylinders [–]–the fuel injection amount that combusts inside the cylinder[mg/INJ].

Furthermore, the limitation part 81 of the late-post injection amount determination part 23 outputs an integration stop signal so as to freeze the integral action of the integrator 53 of the PID calculation part 63 for at least a part of a duration of time in which the late-post injection amount is limited to the upper limit value of the late-post injection amount. Accordingly, it is possible to reduce overshoot of the late-post injection amount after the limitation is canceled.

Furthermore, the late-post injection amount determination part 23 includes an adder-subtracter 73 into which the output signal of the command saturation part 71 or the limitation part 81 and the output signal of the adder 51 are inputted, and a self-tuning PID 75 that performs self-tuning on the feedback control part 49 on the basis of the difference outputted by the adder-subtracter 73. The output signal of the calculation element 77 of the self-tuning PID 75 is inputted into the adder-subtracter 78 and to the integrator 53.

As described above, by providing the self-tuning PID 75 to address wind up (input saturation) of the feedback control part 49, it is possible to prevent the integral value from continuously accumulating in the integrator 53 of the PID calculation part 63 of the feedback control part 49 while the limiter is applied to the command value by the command saturation part 71. Accordingly, it is possible to improve the following capability at the time when the feedback control target value changes.

A reset part 55 is configured to reset the integral value of the integrator 53 when the exhaust gas flow rate decreases rapidly. The exhaust gas flow rate is calculated on the basis of the measurement value of the air flow rate obtained from an air-flow meter (not depicted), and the fuel injection amount command value to the common rail fuel injection device (not depicted).

The feedforward control part 47 is configured to set a feedforward command value corresponding to the operating condition for the map or the like through a test in advance, and calculate and command the base injection amount (base operation amount) of the late-post injection amount from the map on the basis of the actual measurement value of the exhaust gas flow rate and the difference 'e' between the DPF inlet target temperature and the DOC inlet temperature.

The late-post injection amount determination part 23 includes a limitation part 81 at the output side of the adder 51. The limitation part 81 may be disposed at the output side of the command saturation part 71 as depicted in FIG. 4, or the inlet side of the command saturation part 71. The limitation part 81 is configured to limit the upper limit value of the late-post injection amount on the basis of the air excess ratio of exhaust gas flowing into the DOC 31 obtained on the basis of the temperature index of the DOC 31.

In the present disclosure, "air excess ratio" is substantially the same concept as the "air-fuel ratio", and thus may be interpreted as the air-fuel ratio. Furthermore, "temperature index of the DOC 31" is the index indicating the temperature of the DOC 31, and is, for instance, the inlet temperature of the DOC 31. The temperature index of the DOC 31 may be the average temperature of the DOC 31 obtained by taking the average of the inlet temperature of the DOC 31 and the inlet temperature of the DPF 32 (the output temperature of the DOC 31), or a temperature that represents the temperature of the DOC 31. The air excess ratio is, for instance, a lower limit value of the air excess ratio that is set such that HC slip does not occur.

The late-post injection amount determination part 23 may be configured to determine the upper limit value of the late-post injection amount referring to the information indicating the corresponding relationship between the temperature index of the DOC 31 stored in the storage part 25 and the air excess ratio. The information indicating the corresponding relationship may be a table, a map, or an arithmetic expression.

Figure 5A:
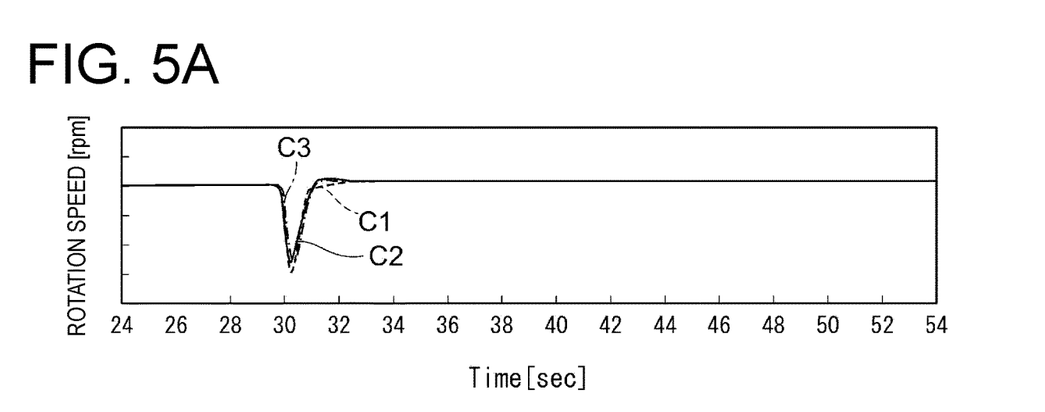
FIG. 5A is a diagram showing the temporal transition of the rotation speed in an experiment for confirming the HC slip behavior upon a load increase.
Figure 5B:
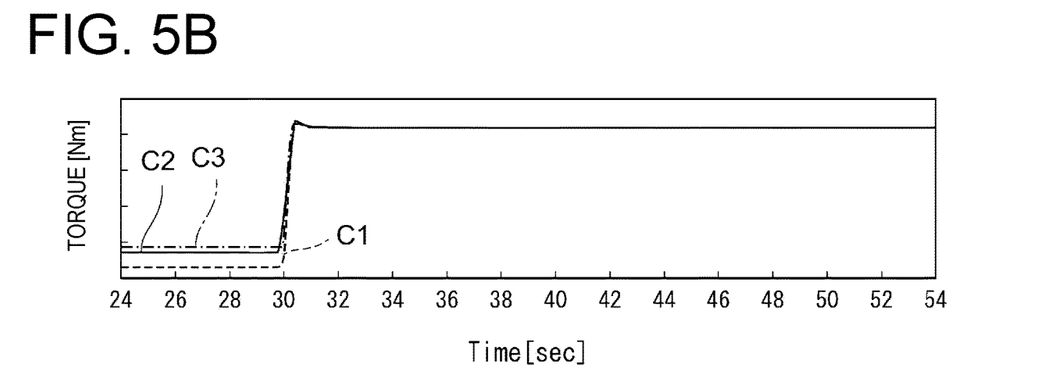
FIG. 5B is a diagram showing the temporal transition of the torque in an experiment for confirming the HC slip behavior upon a load increase.
Figure 5C:
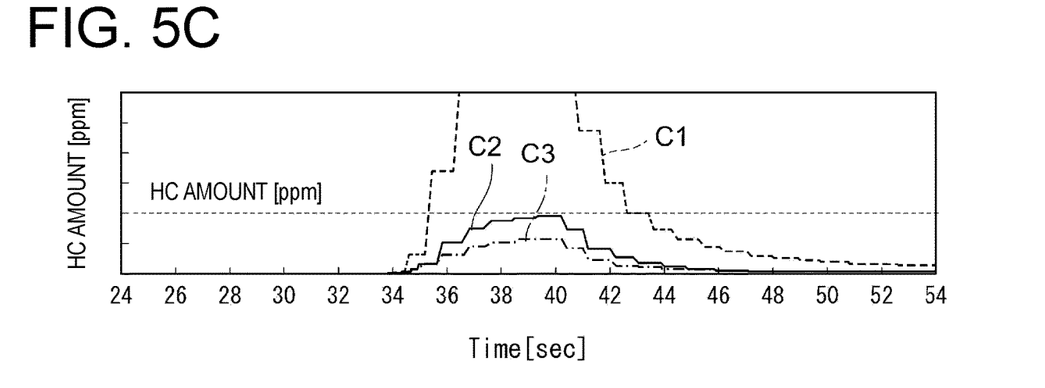
FIG. 5C is a diagram showing the temporal transition of the HC amount in an experiment for confirming the HC slip behavior upon a load increase.

Next, the meaning and specific examples of the information indicating the corresponding relationship will be described. FIG. 5A is a diagram showing the temporal transition of the rotation speed in an experiment for confirming the HC slip behavior upon a load increase. FIG. 5B is a diagram showing the temporal transition of the rotation torque in an experiment for confirming the HC slip behavior upon a load increase. FIG. 5C is a diagram showing the temporal transition of the HC amount in an experiment for confirming the HC slip behavior upon a load increase. The above diagrams have the same x-axis.

In the above diagrams, the dashed line C1 indicates the temporal transition upon application of load, in a case where the rotation speed is 1000 rpm and the inlet temperature of the DOC 31 is 240° C. The solid line C2 indicates the temporal transition upon application of load, in a case where the rotation speed is 1000 rpm and the inlet temperature of the DOC 31 is 270° C. The chain line C3 indicates the temporal transition upon application of load, in a case where the rotation speed is 1000 rpm and the inlet temperature of the DOC 31 is 300° C.

In this experiment, the load is applied near the point of 30 seconds. Accordingly, the rotation speed decreases temporarily as shown in FIG. 5A, the torque increases as shown in FIG. 5B, and the exhaust mount of the non-combusted fuel HC (HC slip) occurs as shown in FIG. 5C. The above experimental results show that the amount of the HC slip depends on the inlet temperature of the DOC 31.

The information indicating the corresponding relationship is set on the basis of the findings from such an experiment. In the information indicating the corresponding relationship, it is preferable that the air excess ratio in a case where the temperature index of the DOC 31 is the second temperature higher than the first temperature is smaller than the air excess ratio in a case where the temperature index of the DOC 31 is the first temperature.

Figure 6:
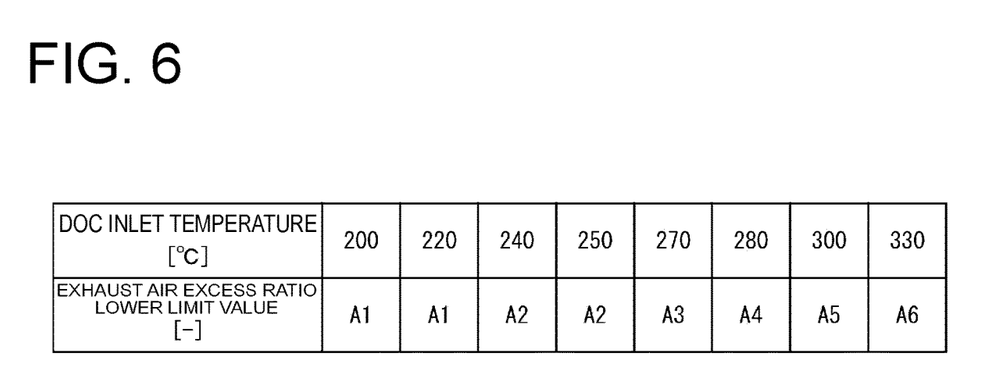
FIG. 6 is a diagram showing an example of information which indicates the corresponding relationship stored by the regeneration control apparatus according to an embodiment.

FIG. 6 is a diagram showing an example of information which indicates the corresponding relationship stored by the regeneration control apparatus 2 according to an embodiment. For instance, as shown in FIG. 6, the information indicating the corresponding relationship may be a table showing the relationship between the DOC inlet temperature as the temperature index of the DOC 31 and the exhaust air excess ratio lower limit value as the air excess ratio.

In the present example, if the DOC inlet temperature is 200° C. or 220° C., the exhaust air excess ratio lower limit value is set to A1. If the DOC inlet temperature is 240° C. or 250° C., the exhaust air excess ratio lower limit value is set to A2. If the DOC inlet temperature is 270° C., the exhaust air excess ratio lower limit value is set to A3. If the DOC inlet temperature is 280° C., the exhaust air excess ratio lower limit value is set to A4. If the DOC inlet temperature is 300° C., the exhaust air excess ratio lower limit value is set to A5. If the DOC inlet temperature is 330° C., the exhaust air excess ratio lower limit value is set to A6.

Furthermore, the exhaust air excess ratio lower limit values preferably have the following relationship: A1>A2>A3>A4>A5>A6. That is, the higher the DOC inlet temperature, the more it is possible to limit the amount of HC slip that depends on the inlet temperature of the DOC 31 by reducing the exhaust air excess ratio lower limit value, thereby reducing generation of white smoke. Furthermore, the exhaust air excess ratio lower limit values may have a relationship A1=A2=A3>A4=A5=A6. It is sufficient if the exhaust air excess ratio lower limit value decreases as the inlet temperature of the DOC 3 increases.

(Process Flow)

Figure 7:
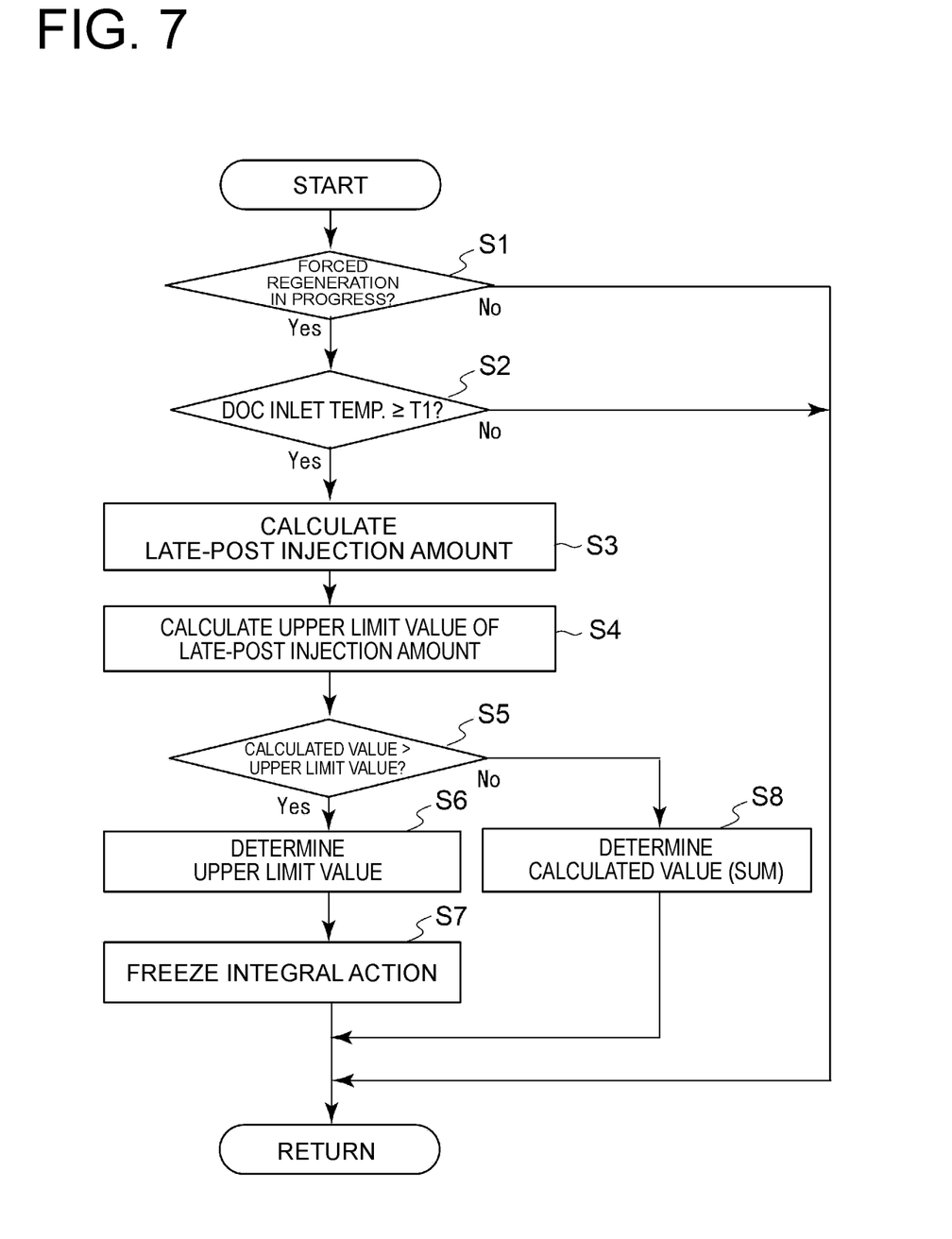
FIG. 7 is a flowchart showing an example of a process to be executed by the regeneration control apparatus according to an embodiment.

Next, the flow of the process to be executed by the regeneration control apparatus 2 according to an embodiment will be described. FIG. 7 is a flowchart for describing an example of a process to be executed by the regeneration control apparatus 2 according to an embodiment. Herein, the process related to the operation of the late-post injection amount determination part 23 will be described.

As depicted in FIG. 7, the regeneration control apparatus 2 determines whether the forced regeneration process is being executed (step S1). If it is determined that the forced regeneration process is not being executed (step S1; No), the regeneration control apparatus 2 skips the subsequent processes and returns. If it is determined that the forced regeneration process is being executed (step S1; Yes), the regeneration control apparatus 2 determines whether the inlet temperature of the DOC 31 is the predetermined temperature T1 or higher (step S2). In step S2, the regeneration control apparatus 2 may compare the DOC temperature index with the predetermined temperature T1, instead of the inlet temperature of the DOC 31.

If it is determined that the inlet temperature of the DOC 31 is not the predetermined temperature T1 or higher (step S2; No), the regeneration control apparatus 2 skips the subsequent processes and returns. If it is determined that the inlet temperature of the DOC 31 is the predetermined temperature T1 or higher (step S2; Yes), the late-post injection amount determination part 23 of the regeneration control apparatus 2 calculates the late-post injection amount (that is, the sum of the base injection amount and the correction injection amount) (step S3).

The late-post injection amount determination part 23 of the regeneration control apparatus 2 is configured to calculate the upper limit value of the late-post injection amount on the basis of the air excess ratio of exhaust gas flowing into the DOC 31 obtained on the basis of the temperature index of the DOC 31 (e.g., the inlet temperature of the DOC 31). Herein, the late-post injection amount determination part 23 of the regeneration control apparatus 2 determines whether the calculated value (that is, sum) is greater than the upper limit value (step S5).

If it is determined that the calculated value (that is, sum) is greater than the upper limit value (step S5; Yes), the late-post injection amount determination part 23 determines the late-post injection amount to be the upper limit value (step S6), and freezes the integral action of the PID calculation part 63 (step S7). If it is determined that the calculated value (that is, sum) is not greater than the upper limit value (step S5; No), the late-post injection amount determination part 23 determines the late-post injection amount to be the calculated value (that is, sum) (step S8).

Steps S5 to S8 are realized by limitation of the late-post injection amount by the limitation part 81. The regeneration control apparatus 2 carries out late-post injection on the basis of the determined late-post injection amount. The calculated value (that is, sum) and the upper limit value of the late-post injection amount need to be calculated so as to change constantly. Thus, the above processes return to step S1 again, and the calculation is repeated.

Working Example and Comparative Example

Figure 8:
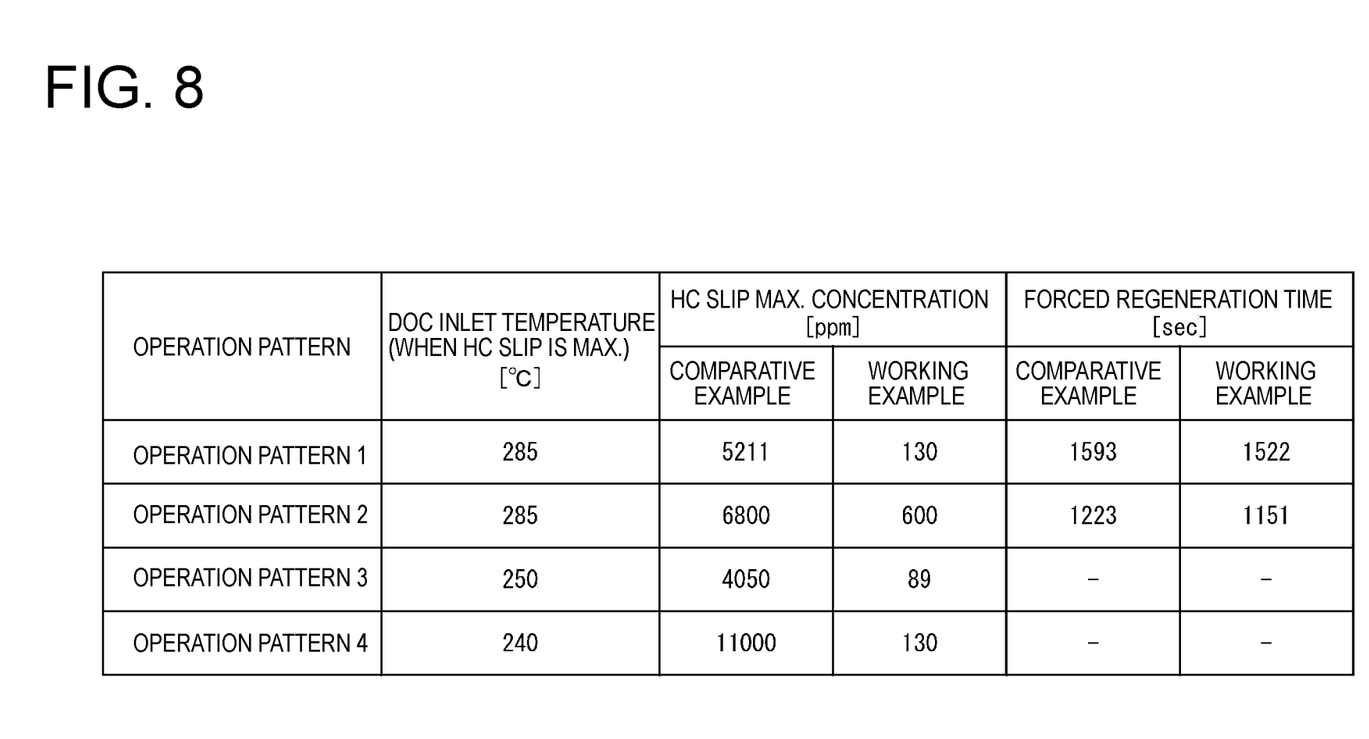
FIG. 8 is a diagram for describing the experiment results of a working example and a comparative example in comparison.

FIG. 8 is a diagram for describing the experimental results of a working example and a comparative example in comparison. In this experiment, the regeneration control apparatus 2 according to the above embodiment is used to obtain the HC slip maximum concentration and the forced regeneration process time of the DPF 32 for each of the four operation patterns (operation patterns 1 to 4).

The inlet temperature of the DOC 31 at the time when the HC slip is the maximum is different between the operation patterns 1, 2, the operation pattern 3, and the operation pattern 4. While the inlet temperature of the DOC 31 at the time when the HC slip is the maximum is the same between the operation pattern 1 and the operation pattern 2, the rotation speed and the increasing pattern of the load are different. The comparative example shows a result in a case where there is no limitation based on the upper limit value of the late-post injection amount, and the working example shows a case where limitation is imposed on the basis of the upper limit value of the late-post injection amount.

As shown in FIG. 3, in the working example, the HC slip maximum concentration is reduced considerably compared to the comparative example. Furthermore, in the working example, the forced regeneration time does not increase compared to the comparative example, and thus negative effects are avoided. From the above experimental results, it can be said that limitation based on the upper limit value of the late-post injection amount is effective.

Embodiments of the present invention were described in detail above, but the present invention is not limited thereto, and various amendments and modifications may be implemented, including combination of more than one embodiment.

(Conclusion)

The contents described in the above respective embodiments can be understood as follows, for instance.

(1) A regeneration control apparatus (2) according to the present disclosure is a regeneration control apparatus (2) for controlling, in an exhaust gas treatment apparatus (3) of a diesel engine (1) including a diesel oxidation catalyst (DOC 31) disposed in an exhaust passage (16) of an internal combustion engine and a diesel particulate filter (DPF 32) disposed downstream of the DOC (31), execution of forced regeneration to remove an exhaust particulate matter (PM) which accumulates on the DPF through a temperature increase of the DPF (32). The regeneration control apparatus (2) includes: a late-post injection amount determination part (23) which determines a late-post injection amount. The late-post injection amount determination part (23) is configured to determine an upper limit value of the late-post injection amount on the basis of an air excess ratio of exhaust gas flowing into the DOC (31) obtained on the basis of a temperature index of the DOC (31).

With the above configuration, the upper limit value of the late-post injection amount is determined on the basis of the air excess ratio of exhaust gas flowing into the DOC (31) obtained on the basis of the temperature index of the DOC (31). Thus, it is possible to realize an adapted control that does not suppress the late-post injection amount unnecessarily, while reducing generation of white smoke. As a result, a negative effect such as an increase in the DPF regeneration time is avoided. Furthermore, since the air excess ratio of exhaust gas is used to determine the upper limit value of the late-post injection amount, it is possible to realize a control with a high accuracy compared to a case where the air excess ratio of supply air is used.

(2) In some embodiments, in the above configuration (1), the regeneration control apparatus (2) further includes: a storage part (25) which stores information indicating a corresponding relationship between the temperature index of the DOC (31) and the air excess ratio. The late-post injection amount determination part (23) is configured to determine the upper limit value of the late-post injection amount referring to the information indicating the corresponding relationship. In the information indicating the corresponding relationship, the air excess ratio in a case where the temperature index of the DOC (31) is a second temperature higher than a first temperature is equal to or smaller than the air excess ratio in a case where the temperature index of the DOC (31) is the first temperature.

The injection amount of non-combusted fuel which can be oxidized by the DOC (31) increases with an increase in the temperature index of the DOC (31). In this regard, with the above configuration, the air excess ratio in a case where the temperature index of the DOC (31) is the second temperature higher than the first temperature is equal to or smaller than the air excess ratio in a case where the temperature index of the DOC (31) is the first temperature. Such an air excess ratio is used to determine the upper limit value of the late-post injection amount. In this case, it is possible to determine the upper limit value of the late-post injection amount to an appropriate value corresponding to the injection amount of non-combusted fuel that can be oxidized by the DOC (31).

(3) In some embodiments, in the above configuration (1) or (2), the late-post injection amount determination part (23) includes: a feedforward control part (47) for determining a base injection amount of the late-post injection amount on the basis of an operation condition of the internal combustion engine; and a feedback control part (49) for determining a correction injection amount of the late-post injection amount on the basis of a difference between an inlet temperature and a target temperature of the DPF (32). The late-post injection amount determination part (23) is configured to determine a sum of the base injection amount and the correction injection amount as the late-post injection amount if the sum is not greater than the upper limit value of the late-post injection amount, and limit the late-post injection amount to the upper limit value of the late-post injection amount if the sum is greater than the upper limit value of the late-post injection amount.

With the above configuration, it is possible to limit the late-post injection amount so as not to be greater than the upper limit value of the late-post injection amount, and control the late-post injection amount to an appropriate value.

(4) In some embodiments, in the above configuration (3), the feedback control part (49) includes a PID calculation part (63), and the late-post injection amount determination part (23) is configured to freeze an integral action of the PID calculation part (63) for at least a part of a duration of time in which the late-post injection amount is limited to the upper limit value of the late-post injection amount.

With the above configuration, it is possible to reduce overshoot of the late-post injection amount after the limitation is canceled.

REFERENCE SIGNS LIST

1 Diesel engine (engine)
2 Regeneration control apparatus
3 Exhaust gas treatment device
4 Temperature increase unit
4A Fuel injection device
4B Intake throttle valve
4C Exhaust throttle valve
4D Exhaust pipe injection device
4E EGR valve
5 Temperature sensor
5A DOC inlet temperature sensor
5B DPF inlet temperature sensor
5C DPF outlet temperature sensor
6 Pressure sensor
6A DPF inlet pressure sensor
6B DPF outlet pressure sensor
6C DPF differential-pressure sensor
7 Exhaust turbocharger
8 EGR device
9 ECU
11 Engine body
12 Combustion chamber
13 Intake passage
14 Intake port
15 Intake manifold
16 Exhaust passage
17 Exhaust port
21 Temperature increase execution part
22 Forced regeneration execution part
23 Late-post injection amount determination part
25 Storage part
31 DOC
32 DPF
41 Exhaust turbine
42 Compressor
43 Shaft
45 EGR pipe
47 Feedforward control part
49 Feedback control part
51, 67 Adder
53 Integrator
55 Reset part
57 Feedforward control command value
59 Target temperature setting part
61, 73, 78 Adder-subtracter
63 PID calculation part
65 Feedback control command value
69 Addition command value
71 Command saturation part
75 Self-tuning PID
77 Calculation element
81 Limitation part
85 Purification rate acquisition part
87 Light oil amount acquisition part
89 Divider

The invention claimed is:

1. A regeneration control apparatus for controlling, in an exhaust gas treatment apparatus of a diesel engine including a diesel oxidation catalyst (DOC) disposed in an exhaust passage of an internal combustion engine and a diesel particulate filter (DPF) disposed downstream of the DOC, execution of forced regeneration to remove an exhaust particulate matter (PM) which accumulates on the DPF through a temperature increase of the DPF, the regeneration control apparatus comprising:

a processor and a storage storing a program that controls the processor, the processor including, a late-post injection amount determination part which determines a late-post my section amount, wherein the late-post injection amount determination part is configured to determine an upper limit value of the late-post injection amount on the basis of an air excess ratio of exhaust gas flowing into the DOC obtained on the basis of a temperature index of the DOC, wherein the late-post injection amount determination part includes:

a feedforward control part for determining a base injection amount of the late-post injection amount on the basis of an operation condition of the internal combustion engine; and a feedback control part for determining a correction injection amount of the late-post injection amount on the basis of a difference between an inlet temperature and a target temperature of the DPF, wherein the late-post injection amount determination part is configured to determine a sum of the base injection amount and the correction injection amount as the late-post injection amount if the sum is not greater than the upper limit value of the late-past injection amount, and limit the late-post injection amount to the upper limit value of the late-post injection amount if the sum is greater than the upper limit value of the late-post injection amount, wherein the feedback control part includes a PID (Proportional-Integral-Differential) calculation part, configured to output the correction injection amount of the late-post injection amount through a Proportional-Integral-Differential calculation based on the difference between the inlet temperature and the target temperature of the DPF, and wherein the late-post injection amount determination part is configured to, freeze an integral action of the PID calculation part for at least a part of a duration of time in which the late-post injection amount is limited to the upper limit value of the late-post Injection amount.

2. The regeneration control apparatus according to claim 1, further comprising:

a memory storage device which stores information indicating a corresponding relationship between the temperature index of the DOC and the air excess ratio, wherein the late-post injection amount determination part is configured to determine the upper limit value of the late-post injection amount referring to the information indicating the corresponding relationship, and wherein, in the information indicating the corresponding relationship, the air excess ratio in a case where the temperature index of the DOC is a second temperature higher than a first temperature is equal to or smaller than the air excess ratio in a case where the temperature index of the DOC is the first temperature.

* * * * *